(12) United States Patent
Cho et al.

(10) Patent No.: US 10,991,073 B2
(45) Date of Patent: Apr. 27, 2021

(54) APPARATUS AND METHOD OF PARALLAX-MINIMIZED STITCHING BY USING HLBP DESCRIPTOR INFORMATION

(71) Applicant: Electronics and Telecommunications Research Institute, Daejeon (KR)

(72) Inventors: Yong Ju Cho, Daejeon (KR); Jeong Il Seo, Daejeon (KR); Soon Heung Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 19 days.

(21) Appl. No.: 16/600,229

(22) Filed: Oct. 11, 2019

(65) Prior Publication Data
US 2020/0126182 A1 Apr. 23, 2020

(30) Foreign Application Priority Data
Oct. 23, 2018 (KR) .................. 10-2018-0126501

(51) Int. Cl.
| | |
|---|---|
| *G06K 9/00* | (2006.01) |
| *H04N 13/02* | (2006.01) |
| *G06T 3/40* | (2006.01) |
| *G06T 3/00* | (2006.01) |
| *G06T 5/00* | (2006.01) |
| *G06T 5/50* | (2006.01) |
| *H04N 5/232* | (2006.01) |
| *H04N 5/247* | (2006.01) |
| *G06T 5/40* | (2006.01) |

(52) U.S. Cl.
CPC .......... *G06T 3/4038* (2013.01); *G06T 3/0093* (2013.01); *G06T 5/006* (2013.01); *G06T 5/40* (2013.01); *G06T 5/50* (2013.01); *H04N 5/23238* (2013.01); *H04N 5/247* (2013.01); *G06T 2207/20021* (2013.01)

(58) Field of Classification Search
USPC ....... 382/100, 103, 106–107, 154, 162, 168, 382/173, 181, 189, 199, 209, 224, 232, 382/254, 276, 285–294, 305; 348/43, 48, 348/38
See application file for complete search history.

(56) References Cited

U.S. PATENT DOCUMENTS

| | | | |
|---|---|---|---|
| 9,363,449 B1 * | 6/2016 | Jiang | G06T 5/006 |
| 10,313,565 B2 * | 6/2019 | Novotny | H04N 5/142 |

(Continued)

FOREIGN PATENT DOCUMENTS

| | | |
|---|---|---|
| KR | 1020170084275 A | 7/2017 |
| KR | 1020170134356 A | 12/2017 |

OTHER PUBLICATIONS

Vladan Rankov, Rosalind J. Lock, "An Algorithm for image Stitching and blending". (Mar. 24, 2005), p. 190-199, vol. 5701 (Year: 2005).*

*Primary Examiner* — Seyed H Azarian
(74) *Attorney, Agent, or Firm* — William Park & Associates Ltd.

(57) ABSTRACT

The present invention relates to an apparatus and a method of stitching a real-time image. More specifically, stitching-related information is generated, a parallax occurrence region in an overlap region is tracked, and correction for reducing parallax occurring in the parallax occurrence region and correction of an image distortion occurring in a non-overlap region are performed for output.

16 Claims, 17 Drawing Sheets

(56) References Cited

U.S. PATENT DOCUMENTS

| | | | |
|---|---|---|---|
| 2015/0029306 A1* | 1/2015 | Cho | G06T 7/246 348/38 |
| 2016/0088280 A1* | 3/2016 | Sadi | H04N 5/265 348/48 |
| 2016/0088285 A1* | 3/2016 | Sadi | H04N 13/111 348/43 |
| 2018/0060682 A1* | 3/2018 | Cho | G06K 9/00771 |

* cited by examiner

FIG. 3
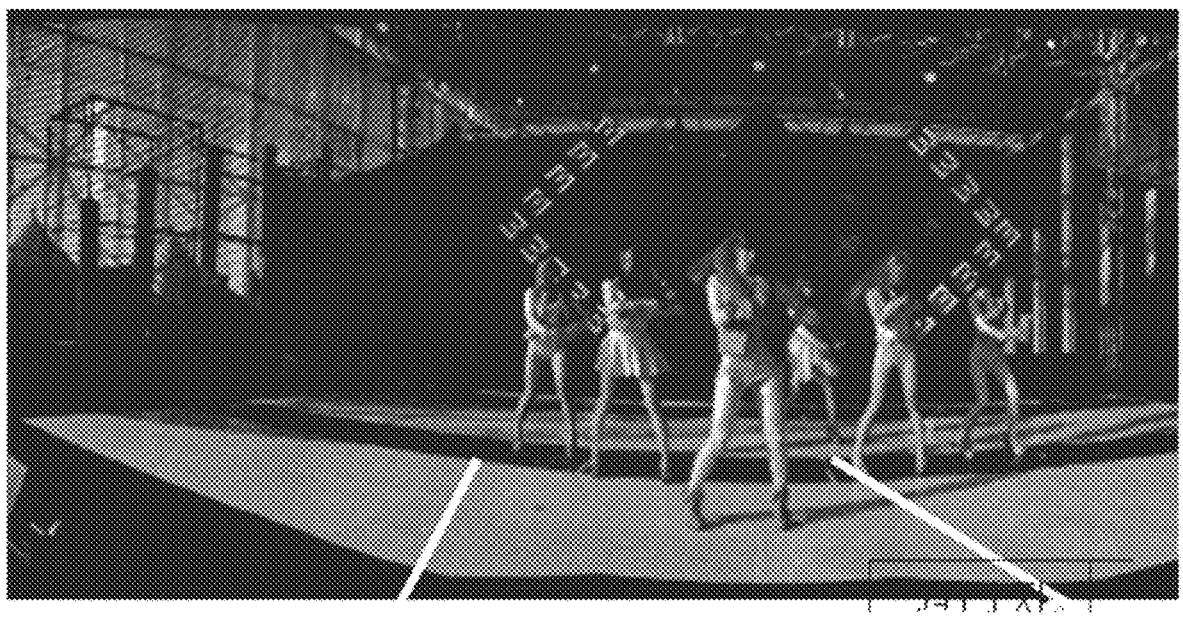
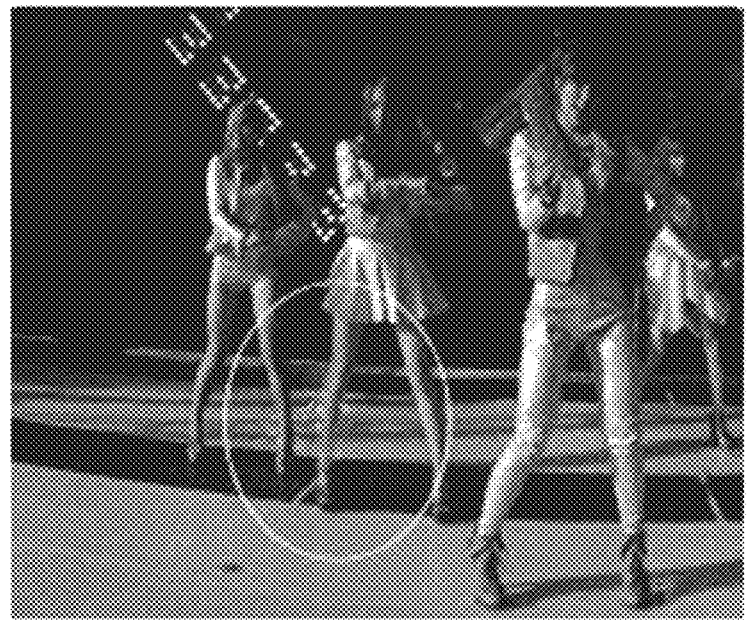

APPARATUS AND METHOD OF PARALLAX-MINIMIZED STITCHING BY USING HLBP DESCRIPTOR INFORMATION

CROSS REFERENCE TO RELATED APPLICATION

The present application claims priority to Korean Patent Application No. 10-2018-0126501, filed Oct. 23, 2018, the entire contents of which is incorporated herein for all purposes by this reference.

BACKGROUND OF THE INVENTION

Field of the Invention

The present invention relates to a technique for minimizing a parallax problem which occurs in panorama stitching, by using descriptor information.

Description of the Related Art

Multiple cameras need to be used to generate a panoramic video, but it is impossible that origin points of the cameras are physically the same, and thus a parallax problem occurs in an overlap region. FIG. 1 is a diagram illustrating a situation where an image is obtained using multiple cameras to generate a panoramic video. As shown in FIG. 1, the cameras are physically unable to perform photographing at the same origin point, resulting in a parallax problem. Herein, as the distance between the cameras increases, the more parallax occurs. FIG. 2 is a diagram illustrating a screen of an input video for stitching. FIG. 3 is a diagram illustrating an image stitched using two input images. Herein, it could be seen that parallax occurs in the overlap region.

In some situations, a serious parallax problem (a ghost effect—a phenomenon that one object appears as two) may occur. First, this is the case where near and far objects are present in the overlap region at the same time. In this case, when stitching, it is impossible to distinguish between near and far objects in 2D, and thus a parallax error occurs. That is, when stitching is performed in accordance with the near object, parallax arises with respect to the far object. In the opposite case, the parallax problem occurs in the same manner. Second, when there is a difference in the physical sensing distance between the cameras, the parallax error occurs. Herein, as the physical sensing distance between the cameras increases, the more parallax occurs.

FIG. 4 is a diagram illustrating matched feature points in an overlap region of two images. When the far object (the light on the back of the stage) and the near object (in the front of the stage) are present in the overlap region at the same time, parallax occurs. For reference, when an input image is obtained using multiple cameras, it is physically impossible that the image origin points of the respective cameras are the same, and this problem may be the reason for parallax.

Therefore, in order to perform stitching by distinguishing between the near object and the far object in the overlap region, the (dynamic) object in the overlap region needs to be converted into appropriate stitching coordinates so that the parallax problem can be minimized. The invention of this has been demanded.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to solve a parallax problem occurring in an overlap region when a panoramic video is generated using multiple input videos.

The present invention is intended to propose a method of minimizing parallax, which occurs when stitching, by using descriptor information on a region where parallax between left and right images occurs.

The present invention is intended to minimize a parallax problem, which occurs in an overlap region when stitching is performed using multiple images, through panorama coordinate transformation utilizing an HLBP descriptor.

The present invention is intended to reduce an image distortion effect in a non-overlap region, which occurs due to a parallax minimization method applying to an overlap region.

The present invention is intended to output a panoramic image without a distortion phenomenon in stitching images in real time.

Accordingly, there is an advantage that the present invention can be widely used as a stitching technique through a multi-camera image acquisition device, which is physically unable to have one origin point.

It is to be understood that technical problems to be solved by the present invention are not limited to the aforementioned technical problems and other technical problems which are not mentioned will be apparent from the following description to a person with an ordinary skill in the art to which the present invention pertains.

In order to achieve the above object, according to an embodiment of the present invention, there are provided an apparatus and a method of stitching a real-time image. Herein, the apparatus for stitching the real-time image may include: an input unit receiving the real-time images; an output unit stitching images subjected to parallax minimization and correction processing for output into a panoramic image; and a control unit processing the received real-time images.

Herein, the control unit may receive reference images from respective cameras; may generate a first lookup table and a blending mask, which are stitching-related information, with respect to each of the reference images; may warp the received real-time images by applying the generated stitching-related information.

Further, the control unit may track a parallax occurrence region in an overlap region; may minimize parallax occurring in the parallax occurrence region; and may perform, when the parallax is minimized, the correction processing with respect to an image distortion occurring in a non-overlap region of the warped real-time images. Herein, the overlap region where the parallax occurs may refer to a region of an overlap of the warped real-time images when the real-time images are output into the panoramic image.

Also, the following embodiments may apply to the apparatus and the method of stitching the real-time image, in common.

According to an embodiment of the present invention, when the apparatus minimizes the parallax occurring in the tracked parallax occurrence region, a descriptor may be calculated for each vertex in the parallax occurrence region and a target vertex for minimizing the parallax may be found to be matched. Herein, the descriptor may be a combination of histograms of oriented gradients (HOG) and of a local binary pattern (LBP) histogram.

According to an embodiment of the present invention, when the apparatus finds the target vertex for minimizing the parallax, the apparatus may update information in the first lookup table on the basis of information on that each of the vertices in the parallax occurrence region is matched with the target vertex for minimizing the parallax, such that a second lookup table may be generated.

According to an embodiment of the present invention, the apparatus may perform correction by assigning the vertices in the non-overlap region a weighting factor based on the parallax detected from the parallax occurrence region. Herein, the weighting factor of which a value is high may be assigned to the vertices nearby the overlap region, among the vertices in the non-overlap region.

According to an embodiment of the present invention, when the parallax occurrence region is tracked, a structural similarity (SSIM) index value may be calculated with respect to vertices in a region corresponding to the overlap region in an image obtained by warping the reference image and with respect to vertices in a region corresponding to the overlap region in the image obtained by warping the received real-time image; and when the SSIM index value is equal to or less than a threshold value, it may be determined that parallax occurs. Herein, when the SSIM index value is calculated, the calculation may be performed with processing on the basis of a patch in which the vertex is a mid-point thereof. Further, the input image may be divided into one or more areas each having a size in which pixels of the input image are divided by a particular value, and each of the areas resulting from the division may correspond to the patch.

According to an embodiment of the present invention, when the first lookup table and the blending mask are generated with respect to each of the reference images, the generation may be performed with processing on the basis of a patch in which a vertex is a mid-point thereof. Herein, the input image may be divided into one or more areas each having a size in which pixels of the input image are divided by a particular value, and each of the areas resulting from the division may correspond to the patch, whereby the method of the present invention is performed.

According to the present invention, when the panoramic video is generated using multiple input videos, the parallax problem occurring in the overlap region can be solved.

According to the present invention, a method of minimizing parallax, which occurs when stitching, by using descriptor information on a region where parallax between left and right images occurs can be provided.

According to the present invention, when stitching is performed using multiple images, the parallax problem occurring in the overlap region can be minimized through panorama coordinate transformation utilizing the HLBP descriptor.

Therefore, there is an advantage that the present invention can be widely used as a stitching technique through a multi-camera image acquisition device, which is physically unable to have one origin point.

Effects that may be obtained from the present invention will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 3 is a diagram illustrating an image stitched using two input images;

DETAILED DESCRIPTION OF THE INVENTION

Figure 1:
FIG. 1 is a diagram illustrating a situation where an image is obtained using multiple cameras to generate a panoramic video.
Figure 2:
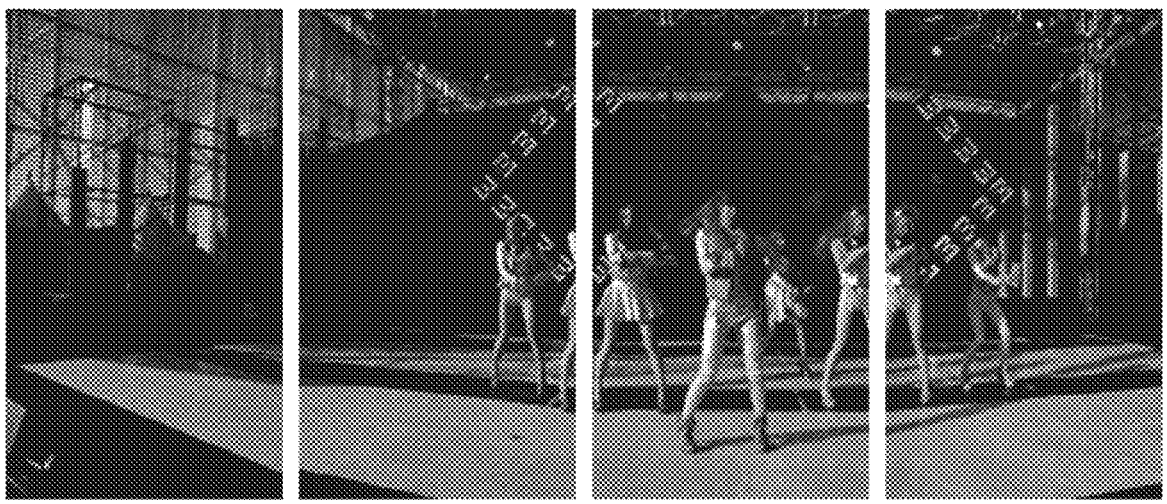
FIG. 2 is a diagram illustrating a screen of an input video for stitching.
Figure 4:
FIG. 4 is a diagram illustrating matched feature points in an overlap region of two images.

Hereinbelow, exemplary embodiments of the present invention will be described in detail with reference to the accompanying drawings such that the present invention can be easily embodied by those skilled in the art to which this present invention belongs. However, the present invention may be embodied in various different forms and should not be limited to the embodiments set forth herein.

In describing the embodiments of the present invention, if it is decided that the detailed description of known function or configuration related to the invention makes the subject matter of the invention unclear, the detailed description is omitted. Also, parts that are not related to the description of the present invention are omitted from the drawings, and like reference numerals designate like parts.

In the present invention, when a constituent element is "coupled to", "combined with", or "connected to" another constituent element, it can be directly coupled to the other constituent element or intervening constituent elements may be present therebetween. Also, when a component "comprises" or "includes" a constituent element, unless there is another opposite description thereto, the component does not exclude other constituent elements but may further include the constituent elements.

In the present invention, the terms "first", "second", etc. are only used to distinguish one constituent element from another constituent element. Unless specifically stated otherwise, the terms do not denote an order or importance. Thus, without departing from the scope of the present invention, a first constituent element of an embodiment could be termed a second constituent element of another embodiment. Similarly, a second constituent element of an embodiment could also be termed a first constituent element of another embodiment.

In the present invention, constituent elements that are distinguished from each other to clearly describe each feature do not necessarily denote that the constituent elements are separated. That is, a plurality of constituent elements may be integrated into one hardware or software unit, or one constituent element may be distributed into a plurality of hardware or software units. Accordingly, even if not mentioned, the integrated or distributed embodiments are included in the scope of the present invention.

In the present invention, constituent elements described in various embodiments do not denote essential constituent elements, and some of the constituent elements may be optional. Accordingly, an embodiment that includes a subset of constituent elements described in another embodiment is included in the scope of the present invention. Also, an embodiment that includes the constituent elements which are described in the various embodiments and additional other constituent elements is also included in the scope of the present invention.

The present invention relates to a technique for minimizing parallax of stitching, by utilizing descriptor information on a region where parallax between left and right images (or current and preceding frames) occurs.

Hereinafter, exemplary embodiments of the present invention will be described with reference to the accompanying drawings.

Figure 5:
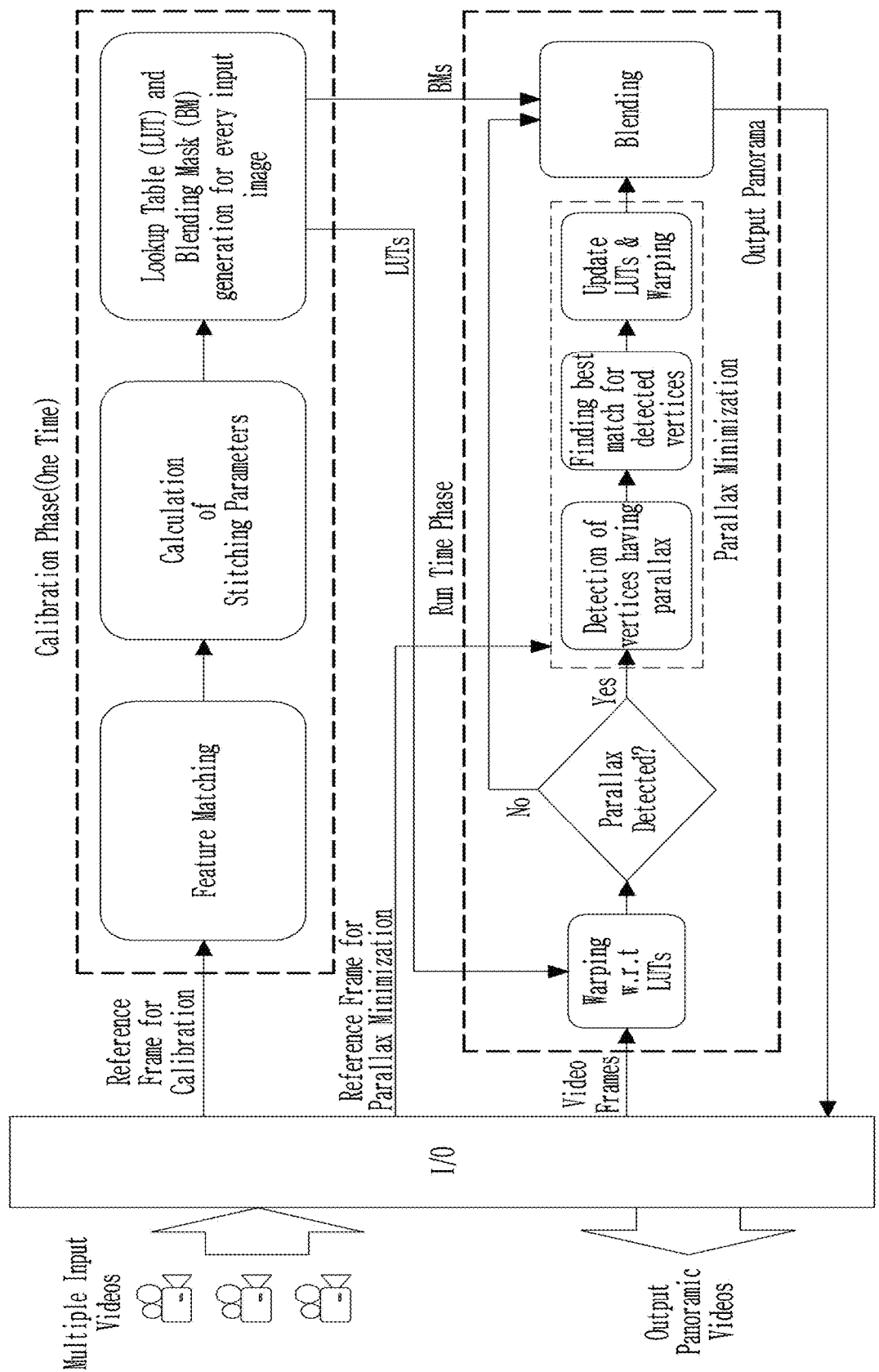
FIG. 5 is a schematic diagram illustrating a method of stitching a real-time image according to an embodiment of the present invention.

FIG. 5 is a schematic diagram illustrating a method of stitching a real-time image according to an embodiment of the present invention.

The method of stitching a real-time image according to the embodiment of the present invention may be roughly divided into a calibration phase and a run-time phase.

In the calibration phase, stitching is performed frame by frame in multiple video sequences, and then with respect to each input video to be used in the run-time phase, a lookup table (LUT) and a blending mask (BM) are generated.

In the run-time phase, first, a moving object in an overlap region is detected with respect to all frames. When the moving object is not detected, the output of the corresponding frame is rendered using the lookup tables (LUTs) generated in the calibration phase are used. When the moving object in the overlap region is detected, the lookup table (LUT) of the region in which parallax is present is updated, and then the output is rendered using the updated lookup tables.

Figure 6:
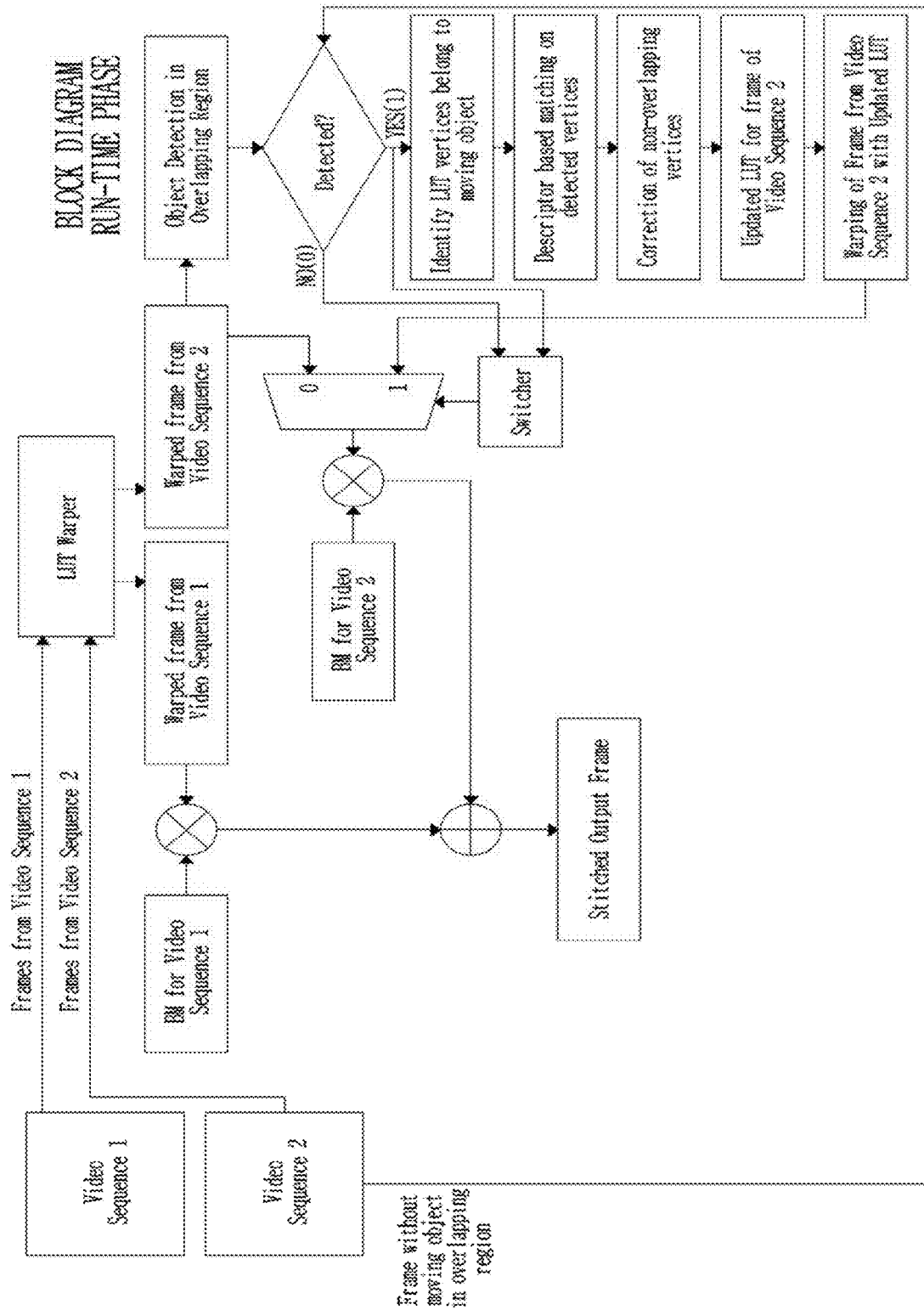
FIG. 6 is a schematic diagram illustrating a method of stitching a real-time image according to an embodiment of the present invention.

The method of stitching the real-time image according to the embodiment of the present invention may be represented by the schematic diagram shown in FIG. 6.

Figure 7:
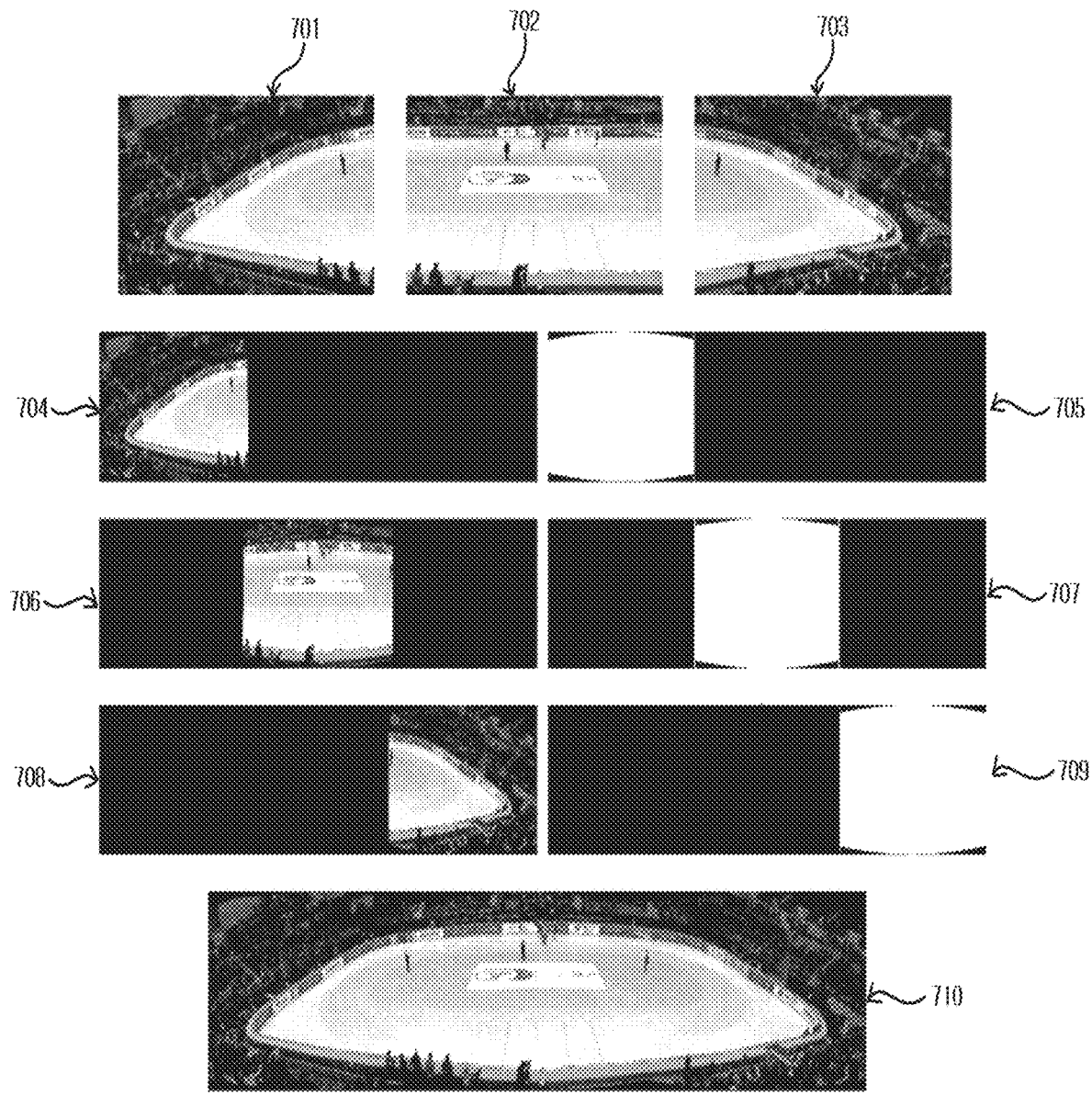
FIG. 7 is diagram illustrating a result of stitching three input images according to an embodiment of the present invention.

FIG. 7 is diagram illustrating a result of stitching three input images according to an embodiment of the present invention. Three 4K input images 701, 702 and 703 are to be stitched. Images 704 to 710 in FIG. 7 show the images of 701 to 703 in FIG. 7, which are warped with the LUTs and the BMs.

More specifically, images 704 and 705 in FIG. 7 show left images resulting from warping the image 701 in FIG. 7 by applying the LUT and the BM thereto; Images 706 and 707 in FIG. 7 show central images resulting from warping the image 702 in FIG. 7 by applying the LUT and the BM thereto; and images 708 and 709 in FIG. 7 show right images resulting from warping the image in image 703 in FIG. 7 by applying the LUT and the BM thereto. The image 710 in FIG. 7 is a diagram illustrating a panoramic image in which the warped images are combined by applying the respective blending masks (BMs).

Figure 8:
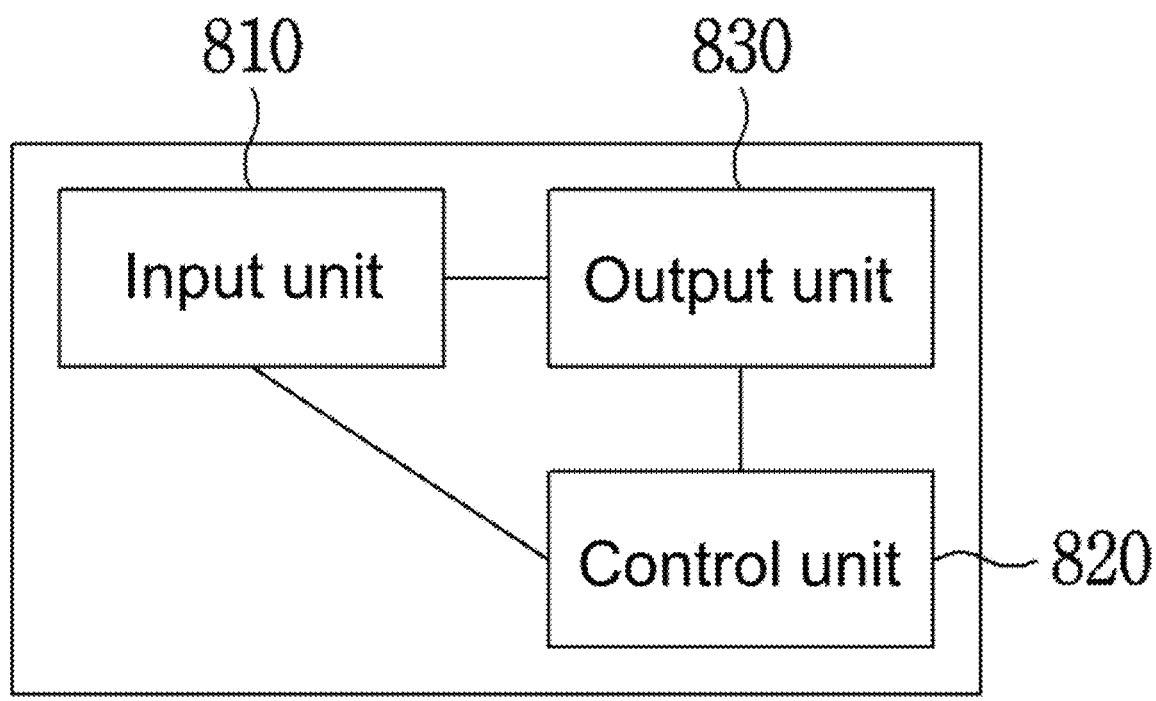
FIG. 8 is a diagram illustrating a configuration of an apparatus for stitching a real-time image according to an embodiment of the present invention.

FIG. 8 is a diagram illustrating a configuration of an apparatus for stitching a real-time image according to an embodiment of the present invention.

The apparatus for parallax minimization may include an input unit 810, a control unit 820 processing real-time images received from the input unit 810, and an output unit 830.

Figure 9:
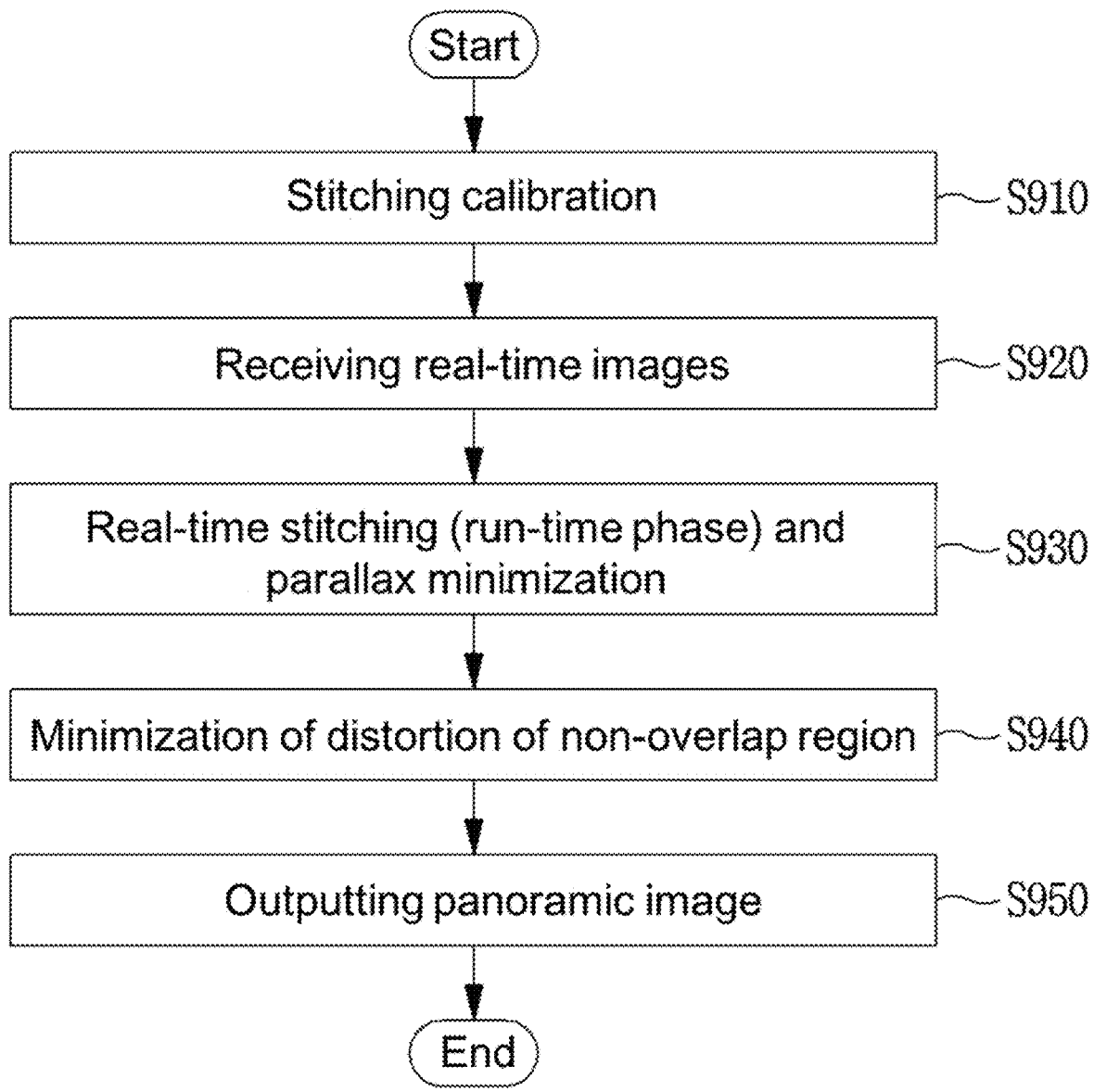
FIG. 9 is a flowchart illustrating an operation of an apparatus for stitching a real-time image according to an embodiment of the present invention.

FIG. 9 is a flowchart illustrating an operation of an apparatus for stitching a real-time image according to an embodiment of the present invention.

The control unit 820 may receive reference images from the respective cameras and then may generate a first lookup table and a blending mask, which are stitching-related information, with respect to each of the reference images at step S910.

In the present invention, the reference images (a reference image set) are images synchronized from several cameras, and may be criterion images for checking whether or not parallax occurs when stitching the images received in real time, compared with the images received in real time. As an embodiment of the present invention, the reference image may correspond to an image in which parallax does not occur because a moving object is not present.

The input unit 810 may receive the real-time images for generating a panoramic image, at step S920.

The control unit 820 may warp the received real-time images by applying the generated stitching-related information, may track a parallax occurrence region in the overlap region, and may minimize the parallax occurring in the parallax occurrence region at step S930. Herein, the overlap region refers to a region of the overlap of the warped real-time images in the case where the real-time images are output into the panoramic image.

Afterward, when the parallax is minimized, the control unit 820 performs correction with respect to an image distortion occurring in a non-overlap region of the warped real-time images.

The output unit 830 may stitch the images subjected to parallax minimization and correction processing by the control unit to output the panoramic image at step S950.

Figure 10:
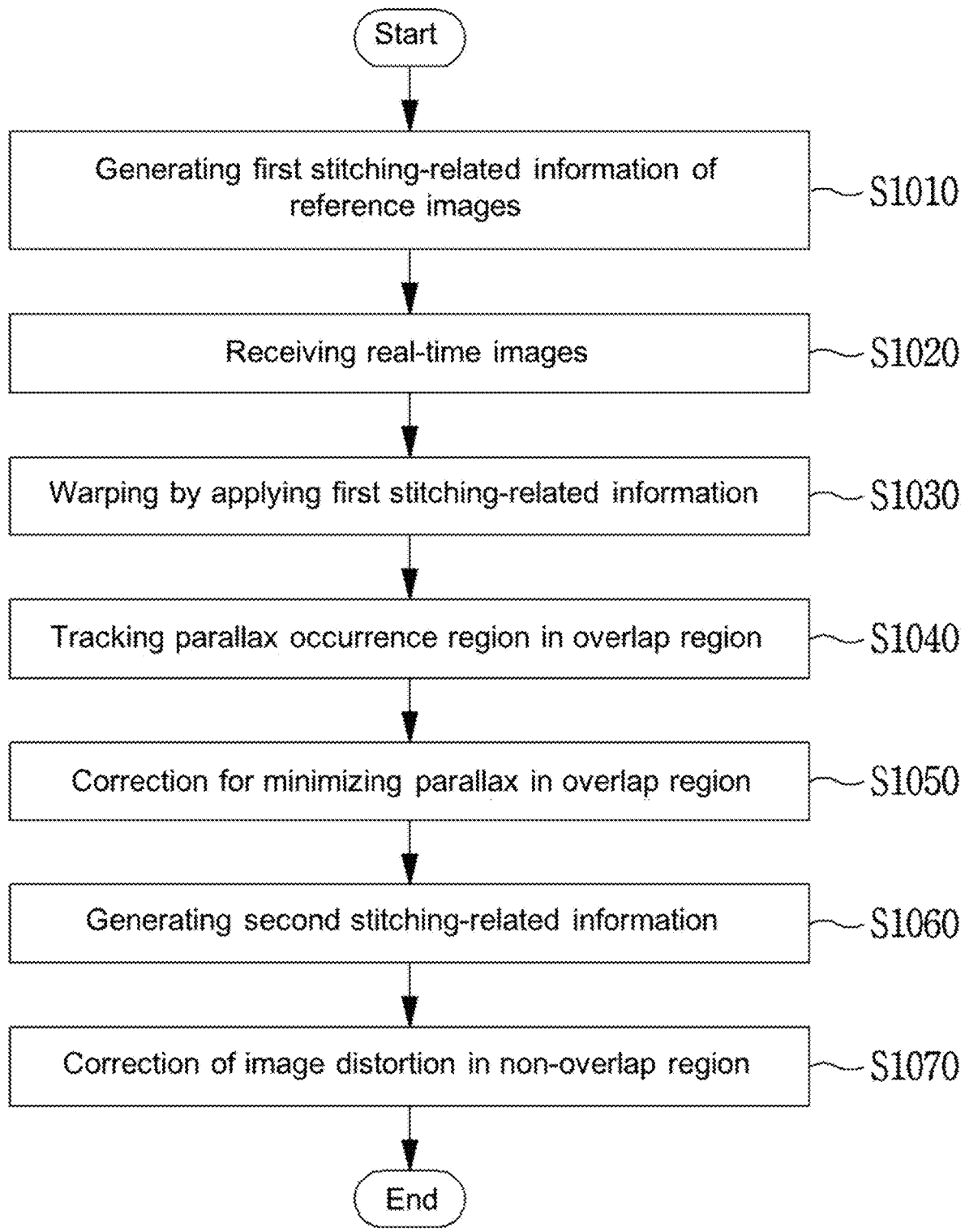
FIG. 10 is a flowchart illustrating a method of minimizing parallax by an apparatus for stitching a real-time image according to an embodiment of the present invention.

FIG. 10 is a flowchart illustrating a method of minimizing parallax by an apparatus for stitching a real-time image according to an embodiment of the present invention.

First, the apparatus for parallax minimization performs a stitching calibration phase to extract and generate stitching information at step S1010.

More specifically, the apparatus for parallax minimization receives images synchronized from the respective cameras. Then, stitching information is generated using the received reference images (the reference image set). The generated stitching information may contain at least one piece of information among the lookup table (LUT) and the blending mask (BM). Herein, the lookup table in the corresponding phase may be referred to as a first lookup table to be distinguished from a lookup table which is updated in the run-time phase.

In the present invention, the lookup table (LUT) includes information indicating a location of the coordinates of the input image after stitching. That is, the lookup table may include information indicating a relationship between an input vertex and an output vertex.

As an embodiment of the present invention, only the pixels (control points) obtained by dividing the input image by a divisor are represented in the LUT defined in the present invention. Herein, the divisor may correspond to a particular value specified by the user. That is, when stitching information is generated for each of the reference images, the images are processed on the basis of a patch in which the vertex is the mid-point thereof, thereby generating the stitching information.

Herein, more specifically, the input image is divided into one or more areas each having the size in which the pixels of the input image are divided by the divisor (the particular value), and each of the areas resulting from the division is regarded as one patch, whereby the stitching information may be generated.

The method of generating the stitching information on the basis of the patch as described above may be used when the stitching information, such as the lookup table or the blending mask, is generated. However, the stitching information is not generated being limited to the embodiment of the present invention. The generation of the stitching information may be processed on the basis of the patch, but the sizes of the patches may vary according to the value of the divisor. Also, other methods of processing an image in such a manner as to represent the relationship between the coordinates of the input image and the coordinates thereof after stitching may apply to the present invention.

As an embodiment of the present invention, in the case where the first lookup table is generated on the basis of the patch, when the divisor is defined to be 60 in a 1920×1080 image, every 32-th (1920/60) pixel coordinate in length and every 18-th pixel coordinate in width are the control points. That is, in this case, the LUT consists of 60 control points in length and 60 control points in width, in total. As another example, when the divisor in a 1920×1080 image is defined to be 1, a total of 1920×1080 control points are present.

Afterward, the apparatus for parallax minimization may receive a real-time image at step S1020. Herein, the real-time images correspond to several images received as images for generating a panoramic image. The apparatus for parallax minimization may perform warping by applying the stitching-related information generated for each of the received real-time images at step S1030. Herein, the first lookup table generated in the stitching calibration phase may be applied.

Figure 11:
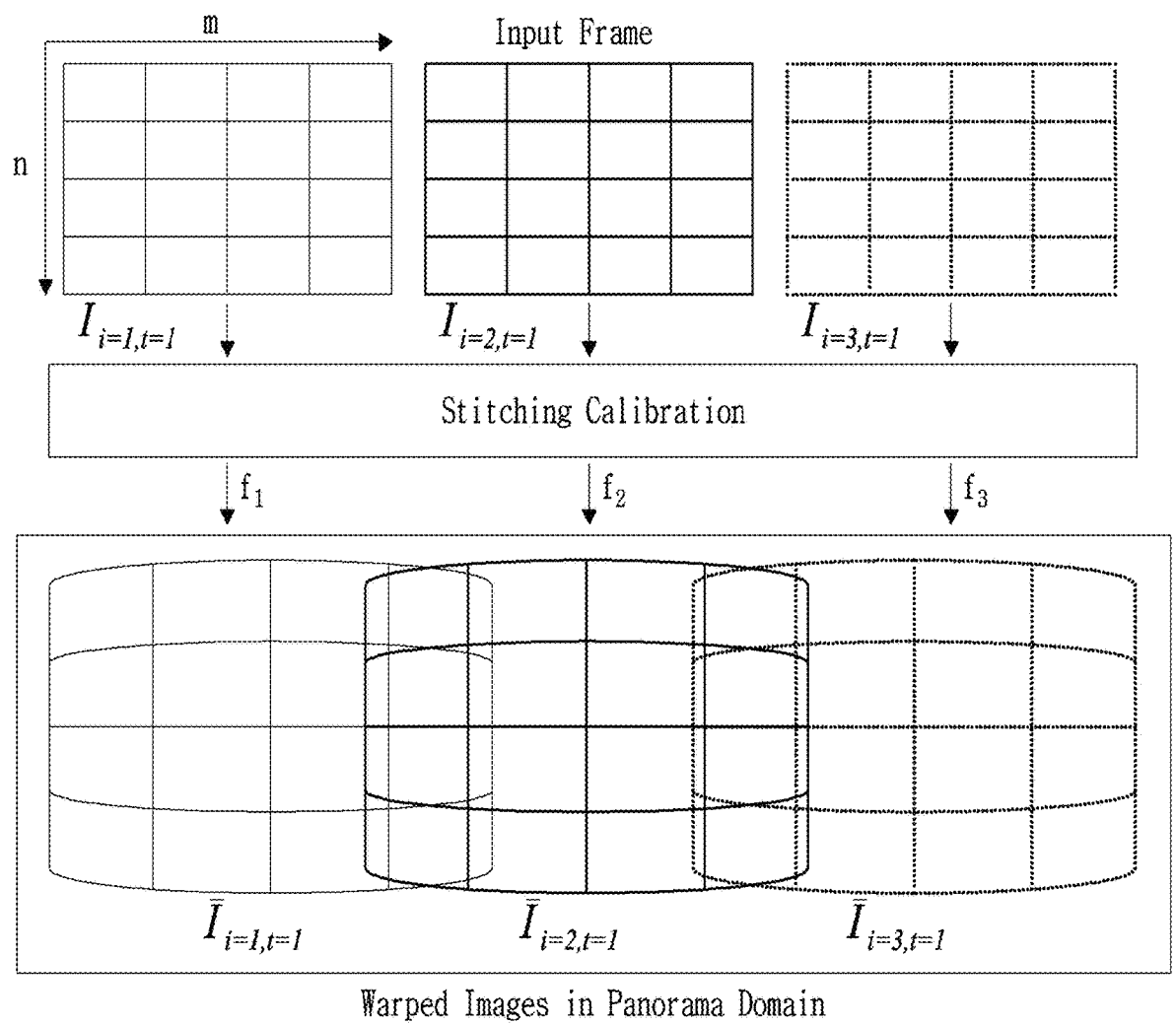
FIG. 11 is a diagram illustrating an image obtained by warping an input image with application of a lookup table.

FIG. 11 is a diagram illustrating an image obtained by warping an input image with application of a lookup table. As shown in FIG. 11, the first lookup table and the blending mask corresponding to first stitching information are generated with respect to each received reference image. The images received from several cameras to generate the panoramic image may be combined by overlapping some regions. Herein, in order to combine the received images with each other to generate a large-size image, the images need to be warped by applying the lookup table. As shown in FIG. 11, the shapes of the images are changed from the quadrangular shape to the transformed shape.

Afterward, the apparatus for parallax minimization may track the parallax occurrence region in the overlap region at step S1040. Herein, the stitched images are searched for the region in which parallax occurs. Parallax occurs in the overlap region of the left image and the right image. More specifically, the overlap region in which parallax occurs refers to a region in which the warped real-time images are joined in the case where the real-time images are combined into the panoramic image for output, which may mean a region of the overlap of the warped real-time images.

For example, when no change occurs in the region of the overlap of the received images, parallax does not occur. However, as an example, when a moving object is present in the region of the overlap of the received images, parallax occurs. The apparatus may track whether or not parallax generated by the moving object is present.

That is, the apparatus for stitching the real-time image may track the region where parallax occurs within the overlap region. In the case where the apparatus for stitching the real-time image tracks the parallax occurrence region, a structural similarity (SSIM) index value is calculated. When the value is equal to or less than a predetermined value, it is determined that parallax occurs.

As an embodiment of the present invention, when the apparatus for stitching the real-time image tracks the parallax occurrence region, two images are used to calculate the SSIM index value. Herein, an image obtained by warping the reference image, which is the criterion, is compared with an image obtained by warping the received real-time image so that whether or not parallax occurs is determined.

More specifically, with respect to the vertices in the region corresponding to the overlap region in the image resulting from warping the reference image and to the vertices in the region corresponding to the overlap region in the image resulting from warping the received real-time image, the structural similarity (SSIM) index value is calculated. When the calculated SSIM index value is equal to or less than a threshold value, the apparatus for stitching the real-time image determines that parallax occurs.

As an embodiment of the present invention, when calculating the SSIM index value, the calculation is performed with processing on the basis of the patch in which the vertex is the mid-point thereof. More specifically, the input image may be divided into one or more areas each having the size in which the pixels of the input image are divided by the particular value, and each of the areas resulting from the division may be defined as a patch. That is, in the present invention, regarding the parallax occurrence region, the structural similarity (SSIM) index value with respect to a patch (64×64) in which the control point of the LUT is positioned in the center is calculated. When the SSIM index value is equal to or less than 0.95, it is regarded that parallax occurs. The value at which it is regarded that parallax occurs is not limited to an arbitrary value, for example, 0.95, and may be a threshold value specified by the user.

The apparatus for stitching the real-time image may perform a processing process for correction so that parallax is minimized with respect to the region checked that parallax occurs at step S1050. That is, the present invention may perform correction for minimizing the parallax occurring in the parallax occurrence region.

When the apparatus for stitching the real-time image minimizes the parallax occurring in the tracked parallax occurrence region, a descriptor is calculated for each of the vertices in the parallax occurrence region and a target vertex for minimizing parallax is found to be matched, thereby minimizing the parallax occurring. That is, the image may be corrected in a manner that reduces the parallax occurring. Herein, according to the embodiment of the present invention, the vertices in the present invention may correspond to the control points defined in the present invention.

More specifically, when performing the correction for reducing the parallax occurring in the parallax occurrence region, the apparatus for stitching the real-time image calculates the descriptors with respect to the respective vertices in the parallax occurrence region, searches for the target vertex for reducing the parallax occurring at the vertex in the parallax occurrence region by using the calculated descriptors, and matches the vertex in the parallax occurrence region with the target vertex, whereby the correction of the image is performed.

Further, in this case, the apparatus of the present invention may search for the target vertex for minimizing parallax. More specifically, considering the parallax occurring when the vertex in the parallax occurrence region is matched with any other vertices, the target vertex matched with the vertex in the parallax occurrence region may be selected to be the vertex that causes the parallax occurring to have the smallest value.

According to the embodiment of the present invention, as the descriptor used for minimizing the parallax occurring, a combination of the histograms of oriented gradients (HOG) and the local binary pattern (LBP) histogram may be used. In the present invention, the corresponding descriptor may be defined as an HLBP descriptor and may be represented as shown in [Equation 1].

$$HLBP=[HOG(1), \ldots, HOG(9), LBP(1), \ldots, LBP(16)] \quad \text{[Equation 1]}$$

As shown in Equation 1, in the HLBP descriptor, both the HOG descriptor value and the LBP descriptor value are represented.

The apparatus for stitching the real-time image according to the embodiment of the present invention may search the parallax occurrence region (patch) for motion vector S with which the parallax is minimized. The optimum motion vector S may be calculated as shown in [Equation 2].

$$\hat{V}_{i,t}^P = \overline{V}_{i,t}^P + s \quad \text{[Equation 2]}$$

In Equation 2, $\hat{V}_t^P$ denotes the target location (target vertex) of the overlapping vertices with parallax occurring at time t; ($\overline{V}_t^P$) denotes the vertex in the overlap region where the parallax occurs in the warped frame at time t; and s denotes the motion vector with which parallax is minimized.

$$\overset{*}{s} = \underset{s \in S}{\operatorname{argmin}} \| HLBP(\overline{V}_{i,t}^P) - HLPBP(\bar{I}_{j,t} + s) \|^2 \quad \text{[Equation 3]}$$

In Equation 3, ($I_t$) denotes the warped frame at time t; and HLBP denotes the descriptor.

Figure 12A:
FIGS. 12A and 12B are diagrams illustrating motion vectors of vertices detected from two different frames having parallax according to an embodiment of the present invention.
Figure 12B:

FIGS. 12A and 12B are diagrams illustrating motion vectors of vertices detected from two different frames having parallax.

Figure 13A:
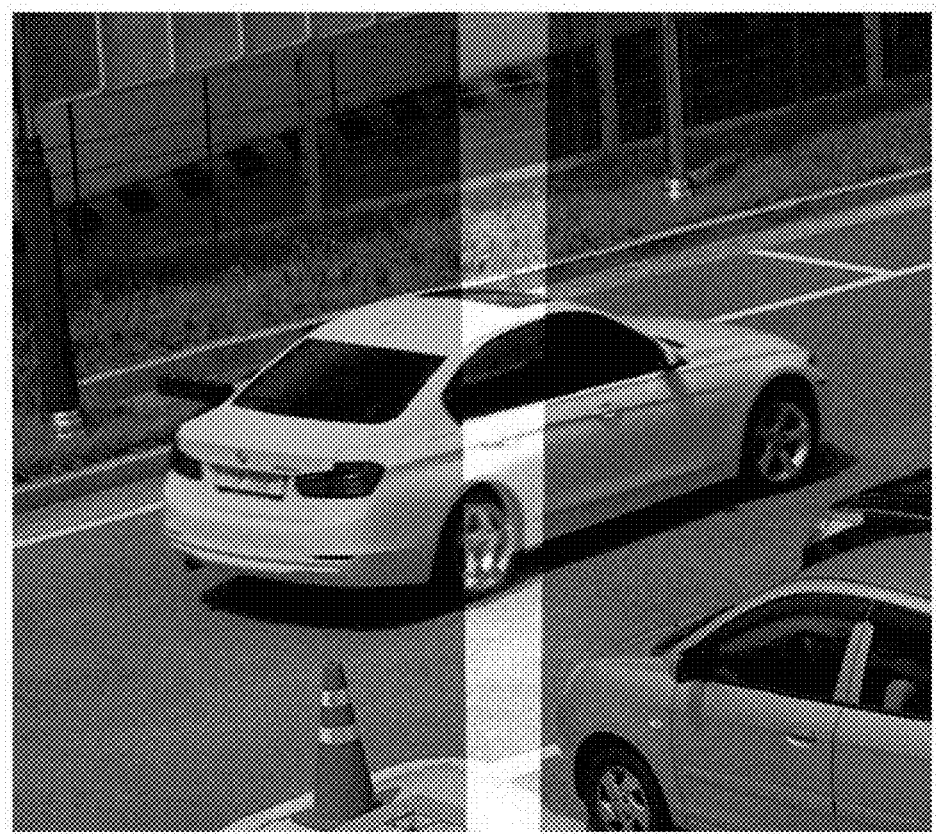
FIGS. 13A and 13B are diagrams illustrating a result of stitching before parallax minimization is applied.
Figure 13B:

FIGS. 13A and 13B are diagrams illustrating a result of stitching before parallax minimization is applied. FIG. 13A shows, as the result of stitching before the parallax minimization function is applied, an image before blending is applied, to clearly show the parallax. FIG. 13B also shows the result of stitching before the parallax minimization function is applied, wherein the vertices of the quadrangles in in FIG. 13B correspond to the control points defined in the present invention.

Figure 14A:
FIGS. 14A and 14B are diagrams illustrating a result of stitching after a parallax minimization function is applied according to an embodiment of the present invention.
Figure 14B:
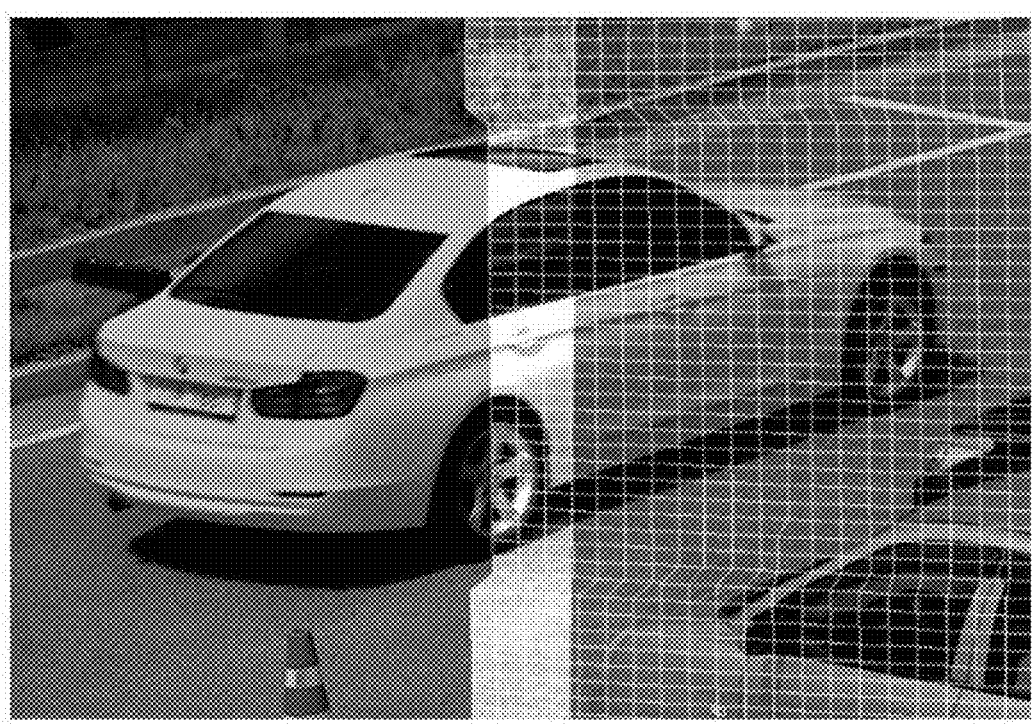

FIGS. 14A and 14B are diagrams illustrating a result of stitching after a parallax minimization function is applied according to an embodiment of the present invention.

The present invention is intended to provide a method of minimizing parallax in stitching by utilizing descriptor information on a region where parallax between left and right images occurs, in order to solve the parallax problem occurring in the overlap region when a panoramic video is generated using multiple input videos. Herein, in the case of stitching where a phase correlation value between the left image and the right image is estimated and then is used for stitching, as a result of panorama surface transformation (or control point coordinate transform), the parallax problem may be minimized. FIG. 14A is a diagram illustrating a result of stitching after the parallax minimization function (phase correlation) is applied. FIG. 14B is a diagram illustrating the control points subjected to coordinate transformation, as a result of stitching after the parallax minimization function (phase correlation) is applied.

Afterward, the apparatus for stitching the real-time image may generate second stitching-related information having stitching information for minimizing the parallax, at step S1060.

When the target vertex for minimizing the parallax by utilizing the HLBP descriptor is found, the apparatus for stitching the real-time image according to the embodiment of the present invention updates the information in the first lookup table on the basis of information on that each of the vertices in the parallax occurrence region is matched with the target vertex for minimizing the parallax, such that a second lookup table is generated. Herein, the second lookup table refers to a lookup table that represents values obtained by changing the coordinate values on the basis of the information in the first lookup table in such a manner as to minimize parallax.

The apparatus for stitching the real-time image may perform image distortion correction on the non-overlap region, at step S1070.

Figure 15A:
FIGS. 15A and 15B are diagrams illustrating a phenomenon in which a non-overlap region of an image is distorted.
Figure 15B:

When the apparatus for stitching the real-time image performs the parallax minimization method to reduce the parallax occurring in the overlap region, a phenomenon that the non-overlap region in the image is distorted occurs. That is, as shown in FIG. 15A and FIG. 15B, the phenomenon that the non-overlap region in the image is distorted occurs. More specifically, the vertices in the non-overlap region may be represented by being artificially stretched, which is called a stretching effect. Therefore, as an embodiment of the present invention, in order to reduce the parallax and distortion phenomenon of the output panoramic image, predetermined processing is performed on the non-overlap region.

As an embodiment of the present invention, the apparatus for stitching the real-time image may perform correction by assigning the vertices in the non-overlap region the weighting factors based on the parallax detected from the parallax occurrence region. Herein, regarding the assigned weighting factors, among the vertices in the non-overlap region, the vertices nearby the overlap region are assigned a high value or a large value. That is, among the vertices in the non-overlap region, the vertices nearby the overlap region need to be moved more so that the distortion phenomenon may be reduced.

According to the embodiment of the present invention, the control points in the non-overlap region are moved by the value of s using the following Equation, thereby minimizing the distortion of the image. The control point in the present invention may be a vertex and a reference point.

$$\hat{V}_{i,t}^{NO} = \overline{V}_{i,t}^{NO} + (\omega(x) \times s)$$ [Equation 4]

$\hat{V}_{i,t}^{NO}$ denote the target locations of the non-overlapping vertices around the moving object at time t; ($\overline{V}_{i,t}^{NO}$) denotes the non-overlapping vertex in the warped frame at time t; and ω(x) may be defined as in Equation 5.

$$\omega(x) = 1 - \frac{1}{1 + e^{-x}}$$ [Equation 5]

Table 1 below shows notations used in the present invention and definitions thereof.

TABLE 1

| Notation | Definition |
|---|---|
| (V_t) | Vertex location in input frame at time t |
| ($\overline{V}_t$) | Vertex in warped frame at time t |
| ($\overline{V}_t^o$) | Overlapping vertices in warped frame at time t |
| P | Subset of overlapping vertices having parallax |
| ($\overline{V}_t^{NO}$) | Non-overlapping vertex in warped frame at time t |
| ($\overline{V}_t^P$) | Overlapping vertices having parallax in warped frame at time t |
| $\hat{V}_t^P$ | Target location of overlapping vertices having parallax at time t |
| $\hat{V}_{L,t}^{NO}$ | Target locations of non-overlapping vertices around moving object at time t |
| S | Motion vector moving from ($\overline{V}_t^P$) to target vertex ($\hat{V}_t^P$) |
| (T^R) | Reference for warped frame when there is no object in overlap region |
| (I_t) | Warped frame at time t |

Figure 16A:
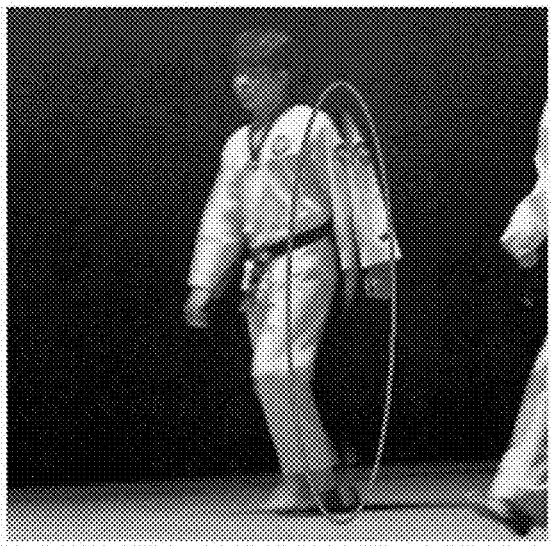
FIGS. 16A to 16C are diagrams illustrating results of respective steps when an apparatus for stitching a real-time image performs a parallax minimization process according to an embodiment of the present invention.
Figure 16B:
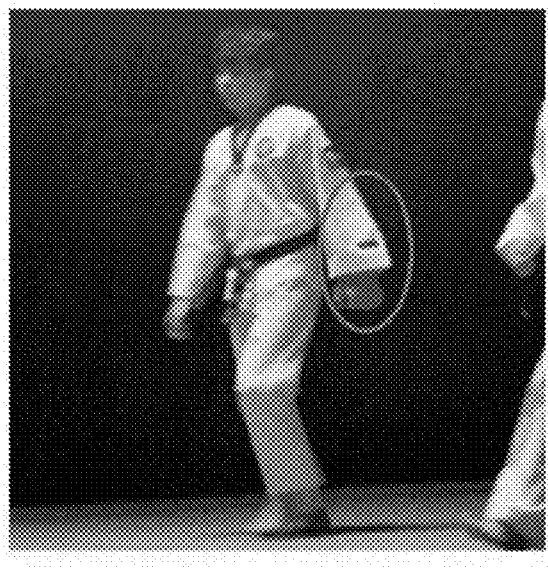
Figure 16C:
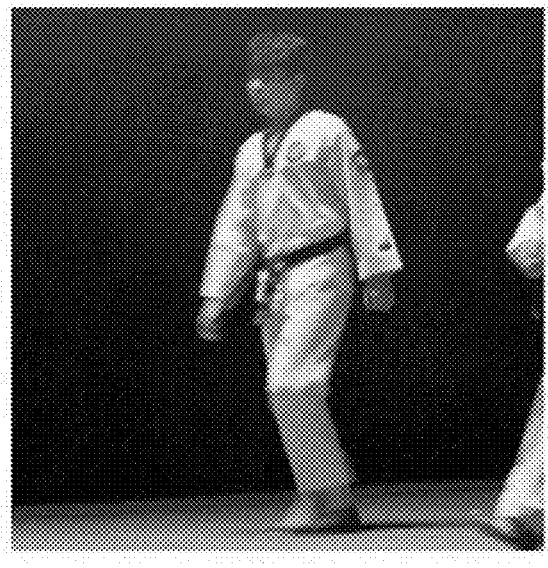

FIGS. 16A to 16C diagrams illustrating results of respective steps when an apparatus for stitching a real-time image performs a parallax minimization process according to an embodiment of the present invention.

More specifically, FIG. 16A is a diagram illustrating that parallax occurs in an overlap region of images when a panoramic image is generated. Particularly, checking the circular portion in FIG. 16A, it is found that parallax occurs due to a combination of two images.

FIG. 16B is a diagram illustrating a result of performing parallax minimization processing with respect to the parallax occurring in the overlap region as shown in FIG. 16A, according to the parallax minimization method of the present invention. Herein, checking the circular portion in FIG. 16B, it is found that a phenomenon of stretching an image in a non-overlap region occurs.

FIG. 16C is a diagram illustrating a final result of processing the image distortion phenomenon occurring in the non-overlap region as shown in FIG. 16B, according to the parallax minimization method proposed in the present invention.

Figure 17A:
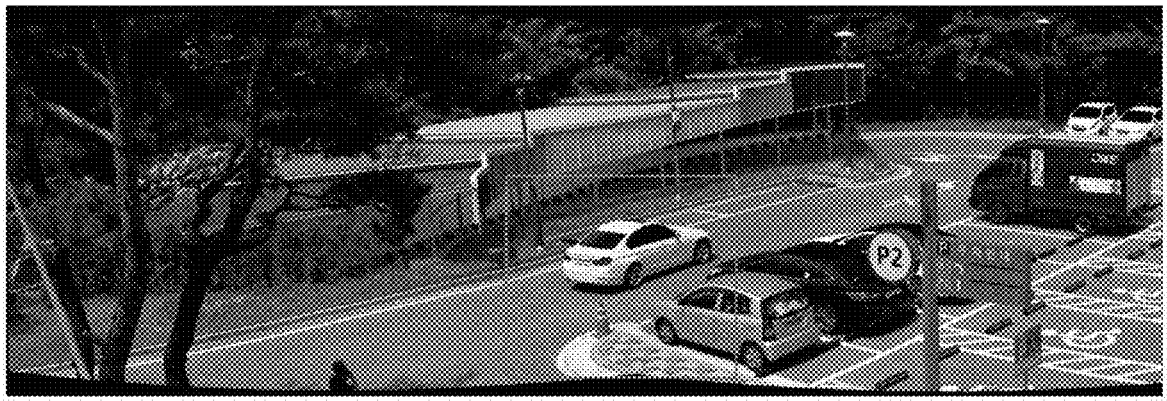
FIGS. 17A and 17B are diagrams illustrating an image of a result of general stitching.
Figure 17B:

FIGS. 17A and 17B diagrams illustrating an image of a result of general stitching. FIG. 17A is a diagram illustrating a result of general stitching, which is a result of the case where the parallax minimization function proposed in the present invention is not applied. FIG. 17B is an enlarged diagram illustrating the parallax occurrence region, and it is found that parallax occurs when the moving object is present in the overlap region of the images.

Figure 18A:
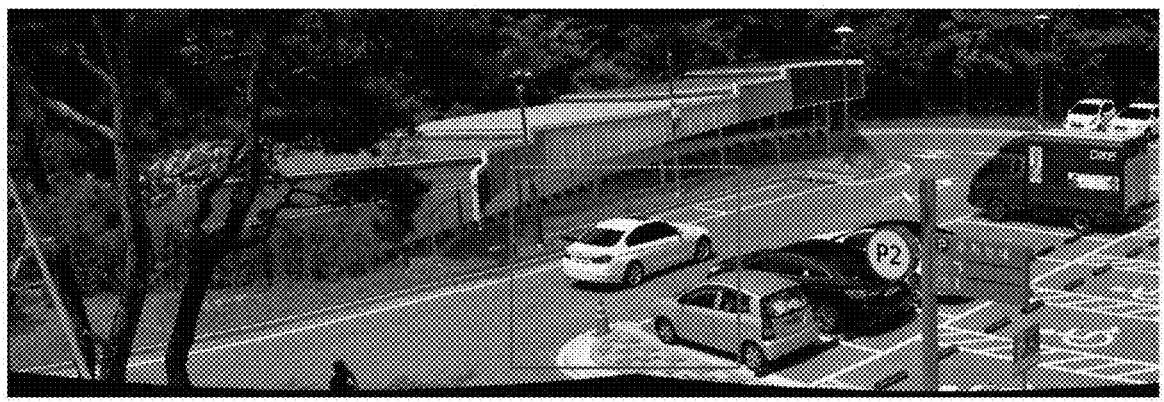
FIGS. 18A and 18B are diagrams illustrating a panoramic image generated by stitching with application of a parallax minimization function by an apparatus for stitching a real-time image according to an embodiment of the present invention.
Figure 18B:

FIGS. 18A and 18B are diagrams illustrating a panoramic image that is obtained by performing stitching with application of a parallax minimization function by an apparatus for stitching a real-time image according to an embodiment of the present invention.

According to the configuration of the present invention, when stitching is performed using multiple images, the parallax problem occurring in the overlap region is minimized through panorama coordinate transformation utilizing the HLBP descriptor. Therefore, there is an advantage that the present invention can be widely used as a stitching technique through a multi-camera image acquisition device, which is physically unable to have one origin point.

FIG. 18A is a diagram illustrating a panoramic image generated by stitching with application of the parallax minimization function by the apparatus for stitching the real-time image according to the embodiment of the present invention. FIG. 18B is an enlarged diagram illustrating a region to which the parallax minimization function is applied. That is, due to application of the parallax minimization method proposed in the present invention, it is found that even when the moving object is present the overlap region of the images, the parallax is minimized for output.

Advantages and features of the present invention, and methods to achieve them will be apparent from the embodiments described in detail with reference to the accompanying drawings. It should be understood that the present invention is not limited to the embodiments and may be embodied in different ways, and that the embodiments are given to provide complete disclosure of the invention and to provide a thorough understanding of the present invention to those skilled in the art. The scope of the present invention is defined only by the claims.

What is claimed is:

1. A method of stitching a real-time image, the method comprising:

receiving reference images from respective cameras and generating a first lookup table and a blending mask, which are stitching-related information, with respect to each of the reference images;

receiving the real-time images from the respective cameras and warping the real-time images by applying the generated stitching-related information;

tracking a parallax occurrence region in an overlap region, the overlap region referring to a region of an overlap of the warped real-time images when the real-time images are combined to be output into a panoramic image;

performing correction for minimizing parallax occurring in the parallax occurrence region;

correcting, when the correction for minimizing the parallax is performed, an image distortion occurring in a non-overlap region of the warped real-time images; and stitching the images subjected to correction processing with respect to the parallax occurrence region and the non-overlap region, for output into the panoramic image, wherein when the correction for minimizing the parallax occurring in the parallax occurrence region is performed, a descriptor is calculated for each vertex in the parallax occurrence region, a target vertex for reducing the parallax occurring at the vertex in the parallax occurrence region is found using the calculated descriptor, and the vertex in the parallax occurrence region is matched with the target vertex, whereby the correction of the image is performed, wherein when the target vertex for reducing the parallax is found, information in the first lookup table is updated on the basis of information on that the vertex in the parallax occurrence region is matched with the target vertex so that a second lookup table is generated.

2. The method of claim 1, wherein the descriptor is a combination of histograms of oriented gradients (HOG) and of a local binary pattern (LBP) histogram.

3. The method of claim 1, wherein considering parallax calculated when the vertex in the parallax occurrence region is matched with any other vertices, the target vertex matched with the vertex in the parallax occurrence region is selected to be the vertex among the vertices, which causes the parallax occurring to have the smallest value.

4. The method of claim 1, wherein the image distortion occurring in the non-overlap region is corrected by assigning vertices in the non-overlap region a weighting factor based on the parallax detected from the parallax occurrence region.

5. The method of claim 4, wherein the weighting factor of which a value is high is assigned to the vertices nearby the overlap region, among the vertices in the non-overlap region.

6. The method of claim 1, wherein when the parallax occurrence region is tracked, a structural similarity index measure (SSIM) value is calculated with respect to vertices in a region corresponding to the overlap region in an image obtained by warping the reference image and with respect to vertices in a region corresponding to the overlap region in the image obtained by warping the received real-time image, and wherein when the SSIM index value is equal to or less than a threshold value, it is determined that the parallax occurs.

7. The method of claim 6, wherein when the SSIM index value is calculated, the calculation is performed with processing on the basis of a patch in which the vertex is a mid-point thereof.

8. The method of claim 7, wherein the input image is divided into one or more areas each having a size in which pixels of the input image are divided by a particular value, and each of the areas resulting from the division corresponds to the patch.

9. The method of claim 1, wherein when the first lookup table and the blending mask are generated with respect to each of the reference images, the generation is performed with processing on the basis of a patch in which a vertex is a mid-point thereof.

10. The method of claim 9, wherein the input image is divided into one or more areas each having a size in which pixels of the input image are divided by a particular value, and each of the areas resulting from the division corresponds to the patch.

11. An apparatus for stitching a real-time image, the apparatus comprising:
an input unit comprising a processor receiving the real-time images;
an output unit comprising a processor stitching images subjected to correction processing with respect to a parallax occurrence region and a non-overlap region, for output into a panoramic image; and
a control unit comprising a processor processing the received real-time images,
wherein the control unit is configured to,
receive reference images from respective cameras and generate a first lookup table and a blending mask, which are stitching-related information, with respect to each of the reference images,
warps the received real-time images by applying the generated stitching-related information,
track the parallax occurrence region in an overlap region, the overlap region referring to a region of an overlap of the warped real-time images when the real-time images are combined to be output into a panoramic image,
perform correction for reducing parallax occurring in the parallax occurrence region, and correct, when the correction for reducing the parallax is performed, an image distortion occurring in the non-overlap region of the warped real-time images,
wherein when the correction for reducing the parallax occurring in the parallax occurrence region is performed, a descriptor is calculated for each vertex in the parallax occurrence region, a target vertex for reducing the parallax occurring at the vertex in the parallax occurrence region is found using the calculated descriptor, and the vertex in the parallax occurrence region is matched with the target vertex, whereby the correction of the image is performed,
wherein when the target vertex for reducing the parallax is found, information in the first lookup table is updated on the basis of information on that the vertex in the parallax occurrence region is matched with the target vertex so that a second lookup table is generated.

12. The apparatus of claim 11, wherein the descriptor is a combination of histograms of oriented gradients (HOG) and of a local binary pattern (LBP) histogram.

13. The apparatus of claim 11, wherein the correction processing is performed by assigning vertices in the non-overlap region a weighting factor based on the parallax detected from the parallax occurrence region.

14. The apparatus of claim 13, wherein the weighting factor of which a value is high is assigned to the vertices nearby the overlap region, among the vertices in the non-overlap region.

15. The apparatus of claim 11, wherein when the parallax occurrence region is tracked, a structural similarity index measure (SSIM) value is calculated with respect to vertices in a region corresponding to the overlap region in an image obtained by warping the reference image and with respect to vertices in a region corresponding to the overlap region in the image obtained by warping the received real-time image, and wherein when the SSIM index value is equal to or less than a threshold value, it is determined that the parallax occurs.

16. The apparatus of claim 15, wherein when the SSIM index value is calculated, the calculation is performed with processing on the basis of a patch in which the vertex is a mid-point thereof.

* * * * *